J. C. CURRYER.
Corn Sheller.

No. 89,001.

Patented April 13, 1869.

Witnesses
James P. Gripes
A. D. Brock

Inventor
J. C. Curryer
Chipman Hosmer &c.
attys

JOSEPH C. CURRYER, OF THORNTOWN, INDIANA.

Letters Patent No. 89,001, dated April 13, 1869.

IMPROVEMENT IN HAND CORN-SHELLERS.

The Schedule referred to in these Letters Patent and making part of the same.

*To all whom it may concern:*

Be it known that I, JOSEPH C. CURRYER, of Thorntown, in the county of Boone, and State of Indiana, have invented a new and valuable Improvement in Hand Corn-Shellers; and I do hereby declare that the following is a full, clear, and exact description of the construction and operation of the same, reference being had to the annexed drawings making a part of this specification, and to the letters and figures of reference marked thereon.

Figure 1:
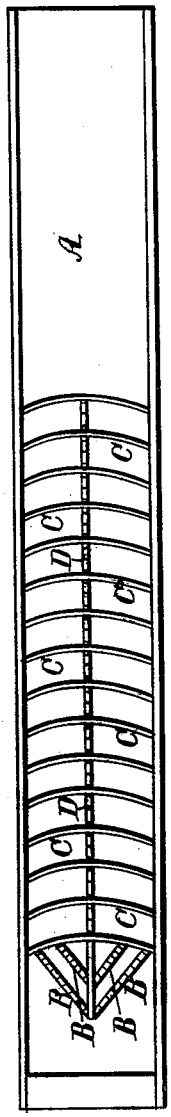

Figure 1, of the drawings, is a plan view of my device.

Figure 2:
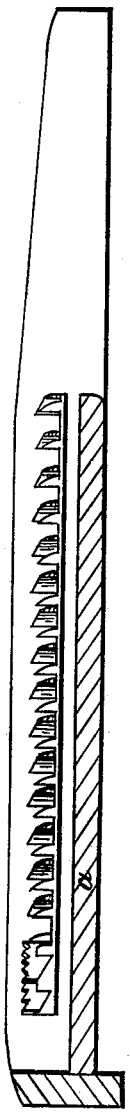

Figure 2 is a transverse section of the same.

My invention relates to hand corn-shellers; and

It consists in constructing a new and useful device for shelling corn by hand, without any injury to the fingers or hand of the operator.

The letter A, on the drawings, represents an oblong box, or chute, open on the top and at the lower end, with a bottom-board for about two-thirds of the distance toward the lower end.

On the inner sides of the chute are two longitudinal cleats, fastened to the sides and bottom of the chute, represented by letters *a*. These cleats serve as supports to the frame-work of my sheller.

Letters B represent serrated bars, situated at the upper end of the frame-work, as shown in fig. 1.

Letters C represent curved cross-bars, for removing, or shelling the corn from the cob. They are placed a little below the level of the serrated bars B, as shown in fig. 2, in order that when pressure is made upon the but of the ear by the serrated bars B, the remainder of the ear will not come in contact with the curved bars, until the corn is removed from the but of the ear.

The letter D represents a longitudinal central serrated bar, for removing the central row of grains, secured to the under edges of the curved cross-bars, as shown. After the central serrated bar has removed the central row of grain, the curved cross-bars C crowd the remainder continually toward the centre.

The true principle in shelling an ear of corn is, to separate a few grains from the but of the ear, followed by one central row along the line of the ear, and then continue, in regular rotation, the shelling-process, by crowding the grains, by means of the curved cross-bars, in both directions, laterally and rearward, thus removing the grains from the ear with great ease.

My device is operated as follows:

The operator seizes the ear of corn in his right hand, with the but toward him, then, by a firm pressure, the grains of the but-end are removed by the serrated bars B, then follows the removing of a central row by means of central serrated bar D, when, by means of the curved cross-bars E, the balance of the grains is easily and speedily removed.

What I claim as my improvement, and desire to secure by Letters Patent, is—

1. The serrated bars B, constructed in the manner and for the purposes set forth.

2. The serrated longitudinal bar D, constructed substantially as and for the purpose specified.

3. The box, or chute, as shown, when used in combination with serrated bars B D, and curved cross-bars C.

In testimony that I claim the above, I have hereunto subscribed my name, in the presence of two witnesses.

JOSEPH C. CURRYER.

Witnesses:
ABNER V. AUSTIN,
PERRY FELTON.